United States Patent
Jaeger et al.

(10) Patent No.: US 10,583,514 B2
(45) Date of Patent: Mar. 10, 2020

(54) CONTACT TIP ROTARY LOCK OF A WELDING TORCH

(71) Applicant: ILLINOIS TOOL WORKS INC., Glenview, IL (US)

(72) Inventors: Thomas Roger Jaeger, Tilbury (CA); Bradley Eugene Whipple, Windsor (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 381 days.

(21) Appl. No.: 15/253,291

(22) Filed: Aug. 31, 2016

(65) Prior Publication Data

US 2017/0080511 A1 Mar. 23, 2017

Related U.S. Application Data

(60) Provisional application No. 62/220,671, filed on Sep. 18, 2015.

(51) Int. Cl.
*B23K 9/29* (2006.01)
*B23P 19/00* (2006.01)

(52) U.S. Cl.
CPC .............. *B23K 9/291* (2013.01); *B23P 19/00* (2013.01)

(58) Field of Classification Search
CPC ........ B23K 9/291; B23K 9/173; B23K 9/295; B23K 9/123; B23K 9/325; B23P 19/00
USPC ........................................ 219/137.31, 137.42
See application file for complete search history.

(56) References Cited

U.S. PATENT DOCUMENTS

| | | | | |
|---|---|---|---|---|
| 2,297,548 A | * | 9/1942 | Fox | F16L 37/22 251/149.6 |
| 3,025,387 A | | 3/1962 | Kinney | |
| 3,083,290 A | * | 3/1963 | Kennedy | B23K 9/298 219/137 R |
| 3,121,784 A | * | 2/1964 | McGinty | B23K 9/291 219/75 |
| 3,210,523 A | | 10/1965 | Cotter | |
| 3,270,179 A | * | 8/1966 | Russell | B23K 9/173 219/74 |

(Continued)

FOREIGN PATENT DOCUMENTS

| | | |
|---|---|---|
| CA | 2304894 A1 | 11/2000 |
| CH | 509127 | 6/1971 |

(Continued)

OTHER PUBLICATIONS

Excerpt from Victor Equipment Company Brochure, pp. 24,32,34 (1951).

(Continued)

*Primary Examiner* — Jimmy Chou
(74) *Attorney, Agent, or Firm* — McAndrews, Held & Malloy, Ltd.

(57) ABSTRACT

A welding torch system includes a diffuser assembly that includes a locking mechanism to receive a contact tip. Additionally, the welding torch system includes the contact tip, which includes locking elements configured to interact with the locking mechanism of the diffuser assembly to secure the contact tip within the diffuser assembly. Further, the contact tip is rotated within the diffuser assembly to securely align the locking elements with the locking mechanism.

20 Claims, 17 Drawing Sheets

(56) References Cited

U.S. PATENT DOCUMENTS

| | | | | |
|---|---|---|---|---|
| 3,283,121 A * | 11/1966 | Bernard | B23K 9/285 | 219/137.44 |
| 3,469,070 A * | 9/1969 | Bernard | B23K 9/123 | 200/332.1 |
| 3,487,194 A * | 12/1969 | Poulton | B23K 9/022 | 116/137 R |
| 3,488,468 A * | 1/1970 | Carbone | B23K 9/291 | 219/136 |
| 3,514,570 A * | 5/1970 | Bernard | B23K 9/123 | 219/137.42 |
| 3,529,126 A * | 9/1970 | Reeh | B23K 9/285 | 219/120 |
| 3,529,128 A * | 9/1970 | Cruz, Jr. | F23D 14/54 | 219/137.44 |
| 3,541,298 A * | 11/1970 | Carkhuff | B23K 9/173 | 219/137.63 |
| 3,576,423 A * | 4/1971 | Bernard | B23K 9/123 | 219/136 |
| 3,596,049 A | 7/1971 | Ogden | | |
| 3,597,576 A * | 8/1971 | Bernard | B23K 9/295 | 219/136 |
| 3,629,547 A * | 12/1971 | Kester | B23K 9/295 | 174/15.7 |
| 3,659,076 A * | 4/1972 | Ogden, Sr. | B23K 9/295 | 219/136 |
| 3,689,732 A | 9/1972 | Hill | | |
| 3,689,733 A | 9/1972 | Matasovic | | |
| 3,825,720 A * | 7/1974 | Zillinger, Jr. | B23K 9/122 | 219/137.44 |
| 3,878,354 A * | 4/1975 | Frantzreb, Sr. | B23K 9/122 | 219/74 |
| 3,934,782 A * | 1/1976 | Cushman | B22D 25/04 | 228/51 |
| 3,940,586 A * | 2/1976 | Stearns | B23K 9/133 | 219/75 |
| 4,008,384 A * | 2/1977 | Cecil | B23K 9/0256 | 219/124.03 |
| 4,049,943 A * | 9/1977 | Pratt | B23K 9/323 | 174/15.7 |
| 4,158,763 A * | 6/1979 | Moerke | B23K 9/295 | 219/137.42 |
| 4,280,043 A | 7/1981 | Feix | | |
| 4,297,561 A * | 10/1981 | Townsend | B23K 9/295 | 219/137.42 |
| 4,365,137 A | 12/1982 | Tarasov | | |
| 4,403,136 A * | 9/1983 | Colman | B23K 9/291 | 219/137.31 |
| 4,529,863 A * | 7/1985 | Lebel | B23K 9/173 | 219/137.42 |
| 4,554,432 A * | 11/1985 | Raloff | B23K 9/295 | 219/137.43 |
| 4,563,569 A | 1/1986 | Shiramizu | | |
| 4,672,163 A | 6/1987 | Matsui | | |
| 4,675,493 A * | 6/1987 | Gartland | H05H 1/3405 | 219/74 |
| 4,731,518 A * | 3/1988 | Parmelee | B23K 9/1087 | 200/505 |
| 4,767,908 A | 8/1988 | Dallavalle | | |
| 4,864,099 A | 9/1989 | Cusick | | |
| 4,945,208 A * | 7/1990 | Lian | B23K 9/291 | 219/137.44 |
| 4,954,688 A | 9/1990 | Winterfeldt | | |
| 4,978,831 A * | 12/1990 | Lian | B23K 9/291 | 219/137.61 |
| 4,994,707 A * | 2/1991 | Stark | H01K 1/18 | 313/269 |
| 5,013,885 A * | 5/1991 | Carkhuff | H05H 1/28 | 219/121.48 |
| 5,097,108 A | 3/1992 | Hamal | | |
| 5,131,869 A * | 7/1992 | Wharton | H01R 13/68 | 439/620.34 |
| 5,132,513 A * | 7/1992 | Ingwersen | B23K 9/295 | 219/137.31 |
| 5,258,599 A * | 11/1993 | Moerke | B23K 9/295 | 219/121.45 |
| 5,260,546 A * | 11/1993 | Ingwersen | B23K 9/295 | 219/137.31 |
| 5,338,917 A * | 8/1994 | Stuart | B23K 9/287 | 219/137.51 |
| 5,380,980 A * | 1/1995 | Colling | B23K 9/32 | 219/137.31 |
| 5,440,100 A * | 8/1995 | Stuart | B23K 9/287 | 219/137.31 |
| 5,491,321 A * | 2/1996 | Stuart | B23K 9/287 | 219/137.41 |
| 5,635,090 A * | 6/1997 | Lubieniecki | B23K 9/173 | 219/136 |
| 5,669,556 A * | 9/1997 | Yoshida | B23K 9/295 | 239/105 |
| 5,726,420 A * | 3/1998 | Lajoie | B23K 9/1336 | 219/137.61 |
| 5,760,373 A * | 6/1998 | Colling | B23K 9/26 | 219/137.61 |
| 5,772,102 A | 6/1998 | New | | |
| 6,075,227 A * | 6/2000 | Lajoie | B23K 9/123 | 219/137.61 |
| 6,078,023 A | 6/2000 | Jones | | |
| 6,163,008 A * | 12/2000 | Roberts | H05H 1/34 | 219/121.48 |
| 6,191,380 B1 | 2/2001 | Thomas | | |
| 6,225,599 B1 | 5/2001 | Altekruse | | |
| 6,271,497 B1 | 8/2001 | Zapletal | | |
| 6,307,179 B1 * | 10/2001 | Walters, III | B23K 9/26 | 219/137.42 |
| 6,525,297 B2 * | 2/2003 | Doherty | B23K 9/173 | 219/137.31 |
| 6,657,162 B1 | 12/2003 | Jung | | |
| 6,689,987 B2 * | 2/2004 | Altekruse | B23K 9/26 | 219/137.42 |
| 6,744,013 B2 * | 6/2004 | Jones | B23K 9/295 | 219/137.42 |
| 6,847,009 B2 * | 1/2005 | Stuart | B23K 9/122 | 219/137.42 |
| 6,924,461 B2 * | 8/2005 | Matiash | B23K 9/323 | 219/137.42 |
| 7,105,775 B2 * | 9/2006 | Giese | B23K 9/123 | 219/137.31 |
| 7,176,412 B2 * | 2/2007 | Wells | B23K 9/291 | 219/137.61 |
| 7,244,909 B2 * | 7/2007 | Kensrue | B23K 9/28 | 219/137.31 |
| 7,271,366 B2 * | 9/2007 | Kensrue | B23K 9/295 | 219/137.61 |
| 7,342,200 B2 * | 3/2008 | Eberle | B23K 9/295 | 219/137.31 |
| 7,381,923 B2 * | 6/2008 | Gordon | B23K 9/123 | 219/137.61 |
| 7,576,300 B2 * | 8/2009 | Giese | B23K 9/123 | 219/137.61 |
| 7,905,741 B1 * | 3/2011 | Wade | H01R 13/639 | 439/321 |
| 9,302,341 B2 * | 4/2016 | Oh | B23K 9/173 | |
| 9,308,599 B2 * | 4/2016 | Sadowski | B23K 9/26 | |
| 9,527,155 B2 * | 12/2016 | Meess | B23K 9/173 | |
| 9,539,663 B2 * | 1/2017 | Grossauer | B23K 9/173 | |
| 9,669,486 B2 * | 6/2017 | Dingeldein | B23K 9/295 | |
| 9,950,386 B2 * | 4/2018 | Cooper | B23K 9/295 | |
| 10,052,708 B2 * | 8/2018 | Redding | B23K 9/295 | |
| 2002/0113047 A1 * | 8/2002 | Doherty | B23K 9/173 | 219/137.42 |
| 2002/0117484 A1 * | 8/2002 | Jones | B23K 10/006 | 219/121.57 |
| 2003/0057196 A1 * | 3/2003 | Jones | B23K 9/295 | 219/137.42 |
| 2003/0209530 A1 * | 11/2003 | Stuart | B23K 9/122 | 219/137.61 |

(56) References Cited

U.S. PATENT DOCUMENTS

| | | | |
|---|---|---|---|
| 2004/0026394 A1* | 2/2004 | Giese | B23K 9/295 219/137.42 |
| 2004/0026395 A1* | 2/2004 | Giese | B23K 9/123 219/137.61 |
| 2004/0079741 A1* | 4/2004 | Keegan | B23K 9/122 219/137.61 |
| 2004/0079784 A1* | 4/2004 | Giese | B23K 9/295 228/44.3 |
| 2005/0109738 A1* | 5/2005 | Hewett | B23K 10/00 219/121.48 |
| 2006/0226132 A1* | 10/2006 | Giese | B23K 9/285 219/137.31 |
| 2006/0226133 A1* | 10/2006 | Giese | B23K 9/323 219/137.31 |
| 2006/0226134 A1* | 10/2006 | Giese | B23K 9/323 219/137.31 |
| 2006/0289413 A1* | 12/2006 | Eberle | B23K 9/295 219/137.31 |
| 2007/0062922 A1* | 3/2007 | Zamuner | B23K 9/123 219/137.31 |
| 2007/0108173 A1* | 5/2007 | Zamuner | B23K 9/287 219/137.31 |
| 2007/0210049 A1* | 9/2007 | Dingeldein | B23K 9/295 219/137.61 |
| 2008/0105668 A1* | 5/2008 | Giese | B23K 9/123 219/137.42 |
| 2010/0012637 A1* | 1/2010 | Jaeger | B23K 9/295 219/136 |
| 2011/0006522 A1* | 1/2011 | Bichler | B23K 9/295 285/420 |
| 2012/0125903 A1* | 5/2012 | Izutani | B23K 9/173 219/136 |
| 2013/0112661 A1* | 5/2013 | Dambra | B23K 9/16 219/74 |
| 2013/0126504 A1* | 5/2013 | Hassan | B23K 9/173 219/137.42 |
| 2013/0126505 A1 | 5/2013 | Hassan | |
| 2013/0126506 A1 | 5/2013 | Hassan | |
| 2013/0134143 A1 | 5/2013 | Hassan | |
| 2014/0131336 A1* | 5/2014 | Jacques | B23K 9/323 219/137.63 |
| 2014/0251972 A1* | 9/2014 | Garvey | H01R 4/54 219/137.61 |
| 2014/0263251 A1* | 9/2014 | Enyedy | B23K 9/325 219/137.42 |
| 2014/0263253 A1* | 9/2014 | Meess | B23K 9/295 219/137.42 |
| 2014/0263254 A1* | 9/2014 | Enyedy | B23K 9/287 219/137.52 |
| 2014/0374399 A1* | 12/2014 | Kachline | B25J 19/00 219/137.9 |
| 2015/0129570 A1* | 5/2015 | Redding | B23K 9/295 219/137.31 |
| 2015/0129571 A1 | 5/2015 | Hassan | |
| 2015/0129572 A1 | 5/2015 | Hassan | |
| 2015/0135796 A1 | 5/2015 | Hassan | |
| 2015/0136747 A1* | 5/2015 | Hassan | B23K 9/295 219/137.52 |
| 2015/0136748 A1 | 5/2015 | Hassan | |
| 2015/0136749 A1 | 5/2015 | Hassan | |
| 2015/0165542 A1 | 6/2015 | Hassan | |
| 2015/0190879 A1* | 7/2015 | Kachline | B23K 9/295 219/137.42 |
| 2016/0050740 A1* | 2/2016 | Zhang | H05H 1/34 219/121.5 |
| 2016/0144446 A1* | 5/2016 | Centner | B23K 9/123 219/137.61 |
| 2016/0229004 A1* | 8/2016 | Moon | B23K 9/0026 |
| 2017/0080511 A1 | 3/2017 | Jaeger et al. | |

FOREIGN PATENT DOCUMENTS

| | | |
|---|---|---|
| DE | 2528972 A1 | 12/1976 |
| DE | 202013102979 | 7/2013 |
| EP | 1388388 | 2/2004 |
| EP | 2457682 | 5/2012 |
| FR | 2291819 | 11/1974 |
| FR | 2291819 A1 | 6/1976 |
| FR | 2349389 A1 | 11/1977 |
| GB | 2098115 A | 11/1982 |
| JP | H05196022 U | 8/1976 |
| JP | 5290444 | 7/1977 |
| JP | S55156680 A | 12/1980 |
| JP | S57134279 A | 8/1982 |
| WO | 0073700 A1 | 12/2000 |
| WO | 2007030720 | 3/2007 |
| WO | 2008018979 | 4/2008 |

OTHER PUBLICATIONS

Excerpt from Victor Equipment Company Welding and Cutting Equipment Brochure, Catalog 20C 10-51 CW (1965).

International Search Report from PCT application No. PCT/US2016/050153, dated Dec. 8, 2016, 13 pgs.

* cited by examiner

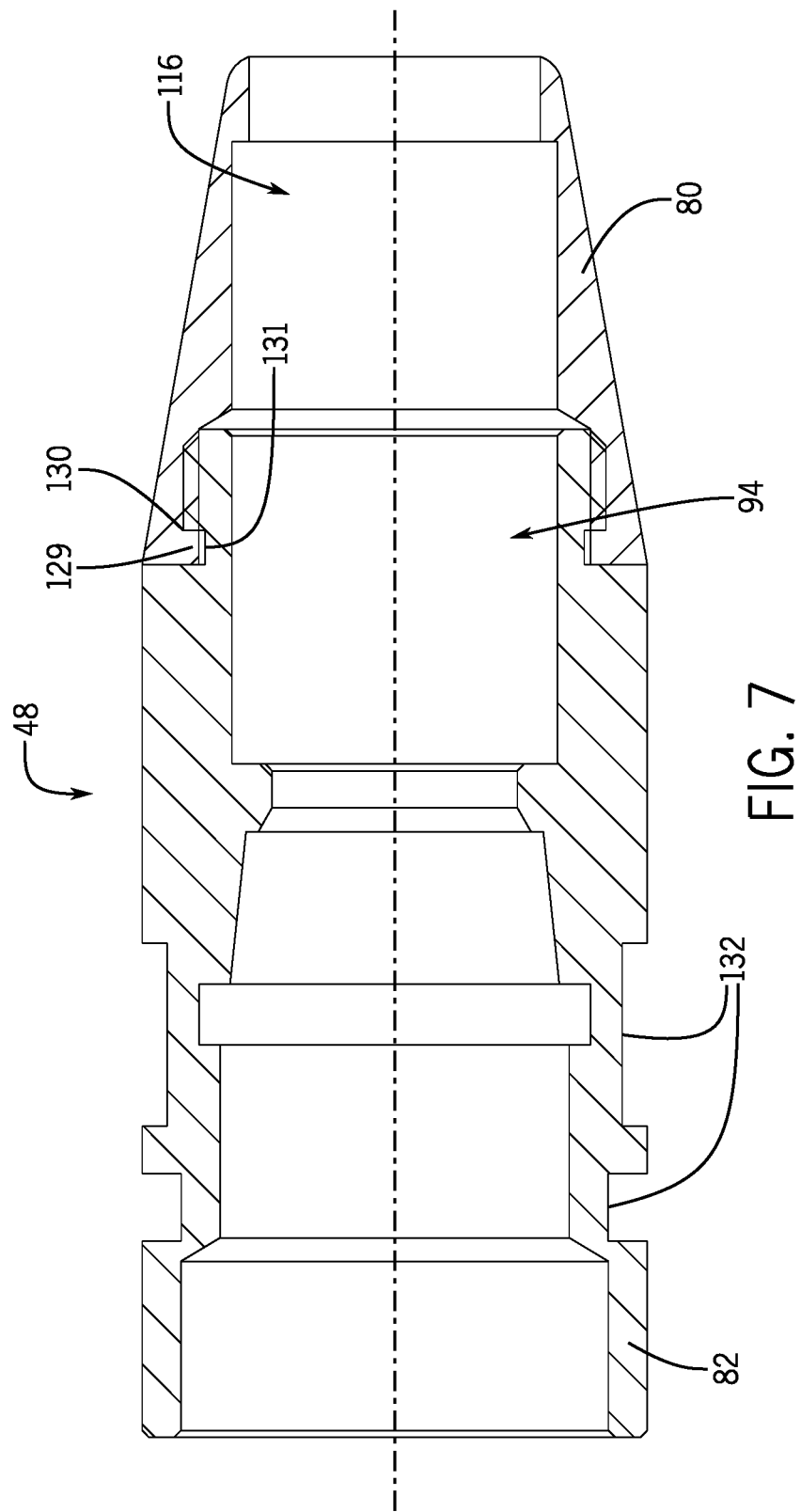

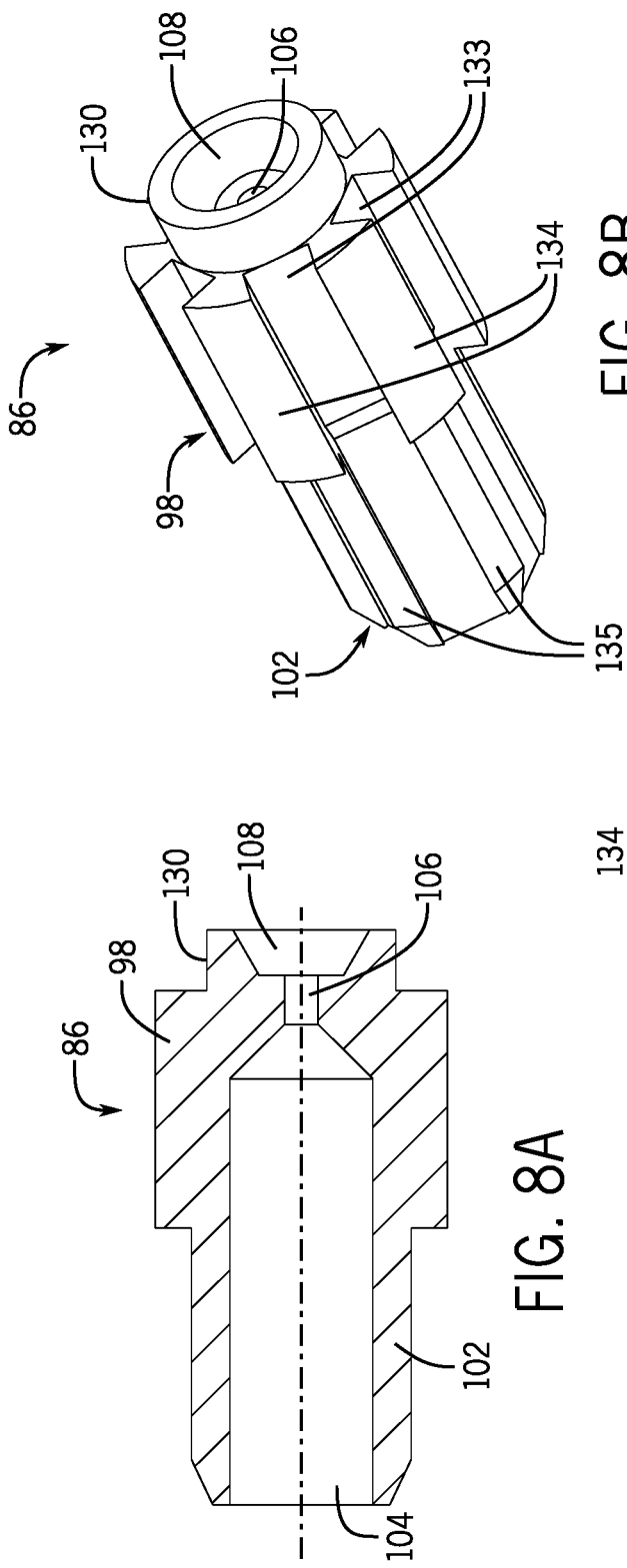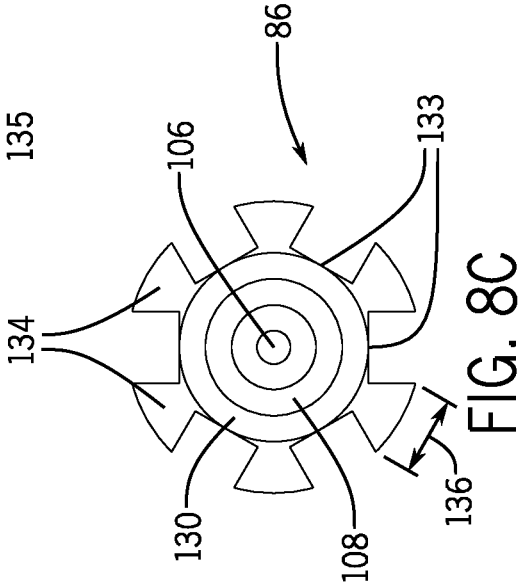

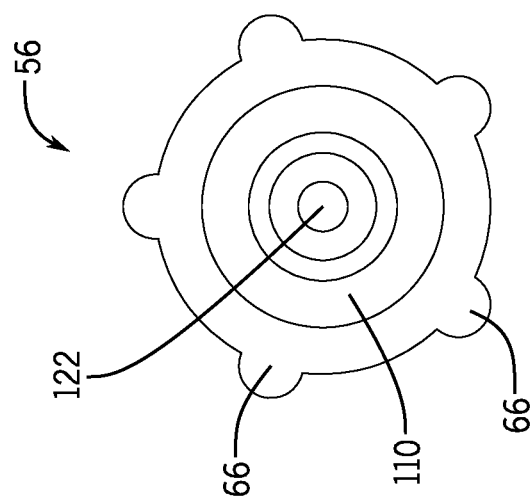
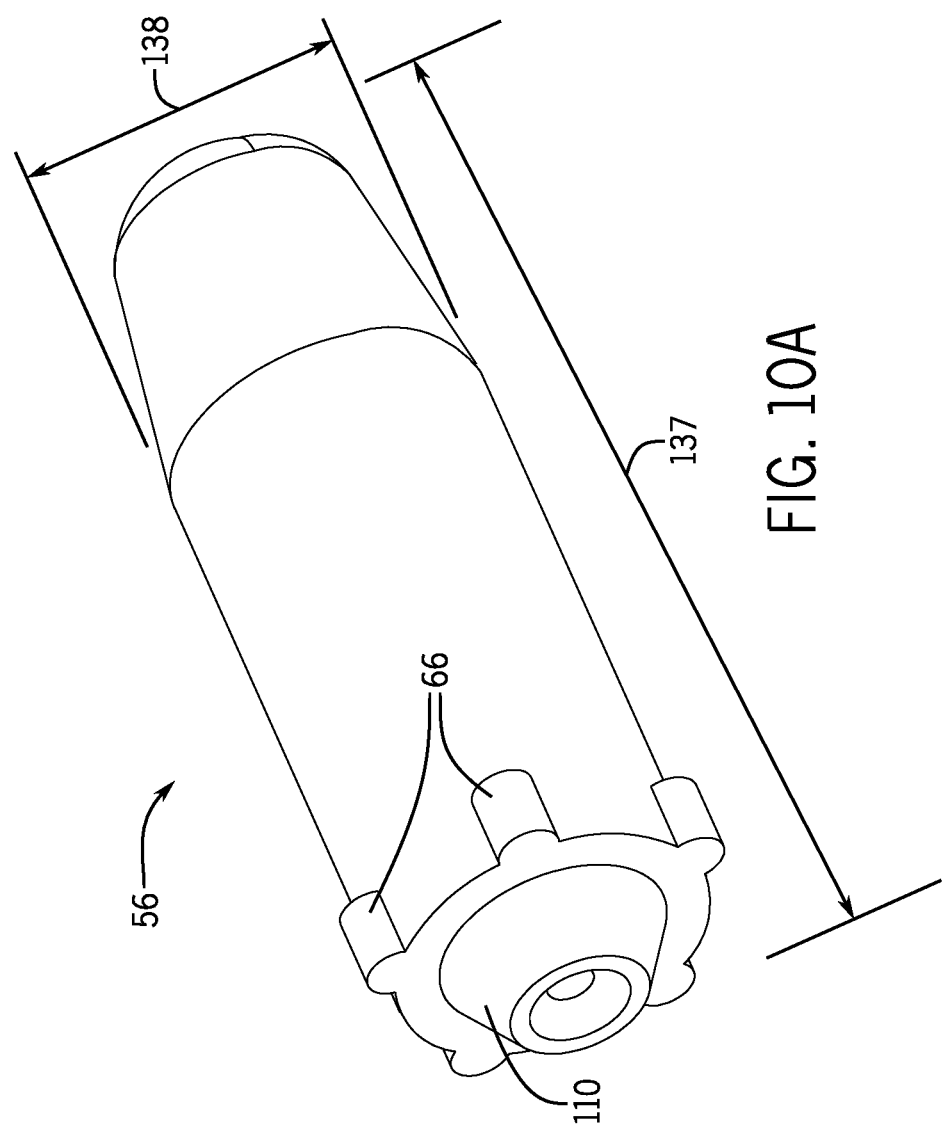

CONTACT TIP ROTARY LOCK OF A WELDING TORCH

CROSS REFERENCE TO RELATED APPLICATION

This application is a Non-provisional U.S. Patent Application of U.S. Provisional Application No. 62/220,671, entitled "Contact Tip Rotary Lock of a Welding Torch," filed Sep. 18, 2015, which is hereby incorporated by reference in its entirety for all purposes.

BACKGROUND

The present disclosure relates generally to welding systems and, more particularly, to securement of contact tips in welding torches of welding systems.

Welding is a process that has increasingly become ubiquitous in various industries and applications. Additionally, as welding has increased in general, automated welding processes are also becoming increasingly popular. With increasing automation in the field of welding, simple designs to meet automation maintenance goals are ever more valuable. For example, automation complexity may decrease as maintenance complexity of the welding systems also decreases.

Therefore, it may be advantageous to provide a mechanism that simplifies replacement and securement of components within welding systems that are frequently replaced. The present subject matter provides mechanisms for replacement and securement of contact tips within a welding system without the use of tools.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method to secure a contact tip in a welding system includes applying an axial force on the contact tip along an axis toward a diffuser assembly of a welding torch. The method also includes rotating the contact tip about the axis within the diffuser assembly while the axial force is applied to the contact tip. Further, the method includes releasing the axial force on the contact tip when the contact tip is securely aligned within the diffuser assembly.

In another embodiment, a welding torch system includes a diffuser assembly that includes a locking mechanism to receive a contact tip. Additionally, the welding torch system includes the contact tip, which includes locking elements configured to interact with the locking mechanism of the diffuser assembly to secure the contact tip within the diffuser assembly. Further, the contact tip is rotated within the diffuser assembly to securely align the locking elements with the locking mechanism.

In another embodiment, a contact tip includes an elongated hollow body including an electrically conductive material. Additionally, the elongated hollow body is mountable without tools to a diffuser assembly mounted to a welding torch. Further, the contact tip includes at least one locking element extending radially outward from an outer circumference of the elongated hollow body near an axial end of the elongated hollow body. The at least one locking element interacts with at least one locking shoulder of the diffuser assembly upon rotation of the contact tip while the at least one locking element is within the diffuser assembly.

DRAWINGS

These and other features, aspects, and advantages of the present disclosure will become better understood when the following detailed description is read with reference to the accompanying drawings in which like characters represent like parts throughout the drawings, wherein:

FIG. 7 is a cross-sectional view of the diffuser assembly of FIG. 3, in accordance with an embodiment;

FIG. 8A is a cross-sectional view of a piston of the diffuser assembly of FIG. 3, in accordance with an embodiment;

FIG. 8B is a perspective view of the piston of FIG. 8A, in accordance with an embodiment;

FIG. 8C is a top view of the piston of FIG. 8A, in accordance with an embodiment;

FIG. 10A is a perspective view of the contact tip of FIG. 3, in accordance with an embodiment;

FIG. 10B is a bottom view of the contact tip of FIG. 9A, in accordance with an embodiment;

DETAILED DESCRIPTION

One or more embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
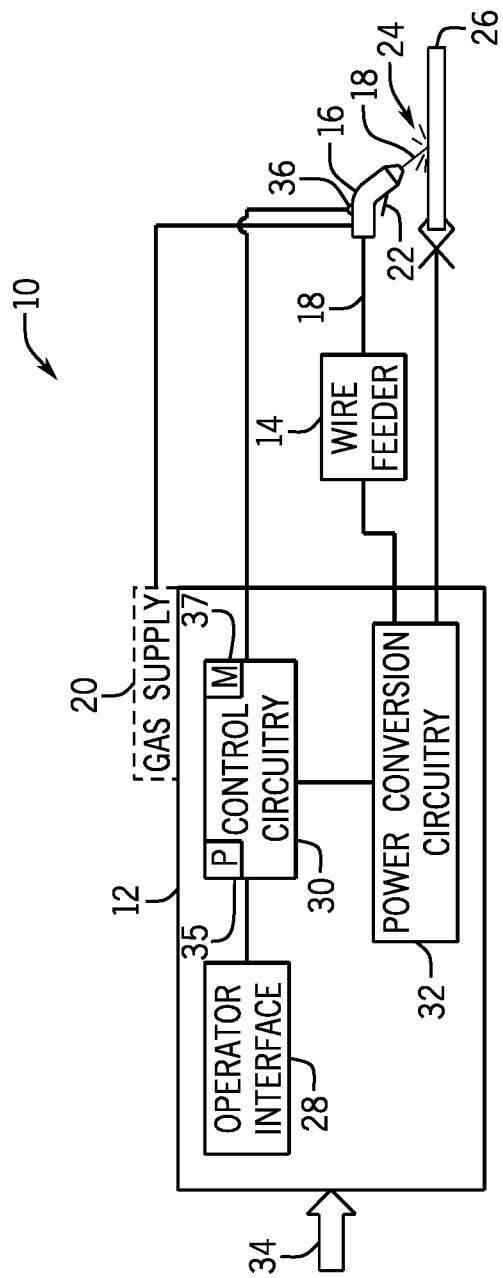
FIG. 1 is a schematic diagram of a metal inert gas (MIG) welding system with a power source and a wire feeder, in accordance with an embodiment.

Turning now to the drawings, and referring first to FIG. 1, an exemplary welding system 10 is illustrated as including a power source 12 coupled to a wire feeder 14. In the illustrated embodiment, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some embodiments, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. In some embodiments, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power, as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 and/or the torch 16. In some embodiments, a processor 35 of the control circuitry 30 determines and/or controls operating parameters of the torch 16. Additionally, the operating parameters may be controlled based at least in part on feedback from the sensors 36. The processor 35 determines and/or controls the operating parameters utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some embodiments, the power source 12 is controlled to operate in a constant current (CC) mode where the control circuitry 30 controls the weld current to be substantially constant while varying the weld voltage during a welding operation.

Figure 2:
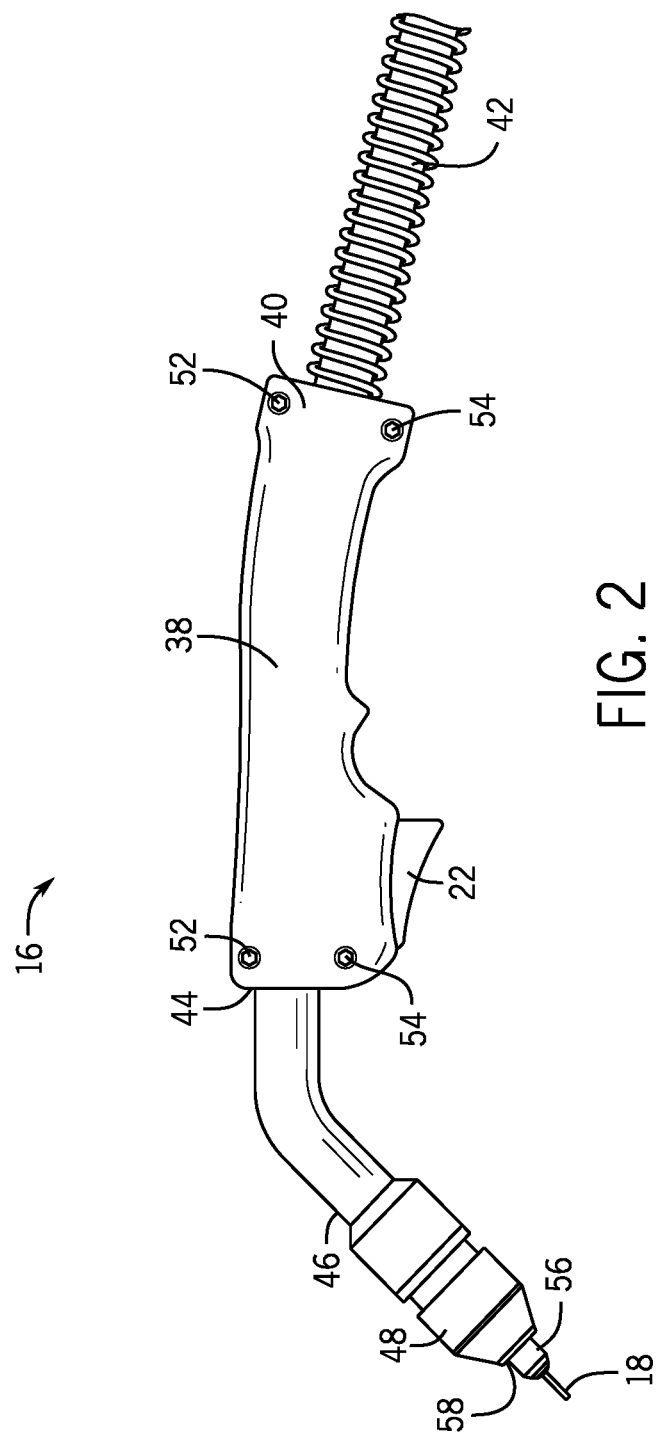
FIG. 2 is a side view of a welding torch of the MIG welding system of FIG. 1, in accordance with an embodiment.

FIG. 2 illustrates an embodiment of the torch 16 of FIG. 1. As discussed in relation to FIG. 1, the torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the wire, the shielding gas, and so forth) are supplied to the weld. Welding consumables generally travel through the handle 38 and exit at a second end 44, which is disposed on the handle 38 at an end opposite from the first end 40.

The torch 16 includes a neck 46 extending out of the second end 44 of the handle 38. As such, the neck 46 is coupled between the handle 38 and a diffuser assembly 48. As should be noted, when the trigger 22 is pressed or actuated, welding wire (e.g., electrode 18) travels through the cable 42, the handle 38, the neck 46, and the diffuser assembly 48, so that the welding wire extends out of a contact tip 56 protruding from a receiving portion 58 of the diffuser assembly 48. Further, as illustrated in FIG. 2, the handle 38 is secured to the neck 46 via fasteners 52 and 54, and to the cable 42 via fasteners 52 and 54.

Figure 3:
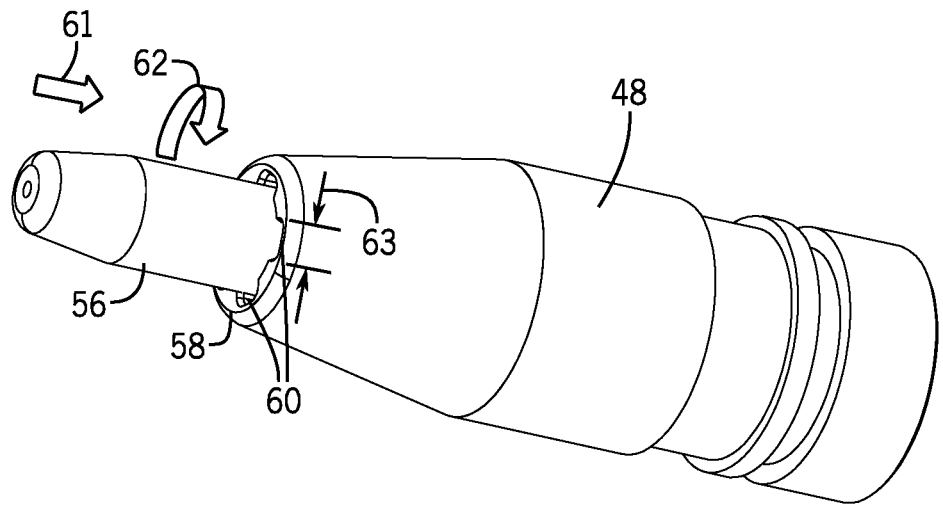
FIG. 3 is a perspective view of a contact tip secured within a diffuser assembly of the welding torch of FIG. 2, in accordance with an embodiment.

FIG. 3 is a perspective view of the contact tip 56 secured within the diffuser assembly 48 of the welding torch 16. The receiving portion 58 of the diffuser assembly 48 receives the contact tip 56 during replacement of the contact tip 56, facilitates mechanical coupling to the welding torch 16 for the contact tip 56, and facilitates electrical coupling to the power source 12 for the contact tip 56, as discussed in detail below. Additionally, the diffuser assembly 48 may be machined to be installed on existing necks 46 of various torches 16. For example, the diffuser assembly 48 may be designed to couple to the neck 46 in such a way that the diffuser assembly 48 enables retrofitting on torches 16 previously equipped with other diffusing devices. Alternatively, in some embodiments, the diffuser assembly 48 may be installed on the neck 46 using a rotary locking mechanism similar to the contact tip rotary locking mechanism discussed in detail below.

Further, the diffuser assembly 48 may include gas-through ports 60 positioned around the receiving portion 58 of the diffuser assembly 48 to facilitate movement of shielding gas to a welding site, such as the work piece 26. The gas-through ports 60 direct the shielding gas axially along the contact tip 56. In directing the shielding gas axially along the contact tip 56, rather than radially outward from the contact tip 56, a pressure head of the shielding gas is reduced. By reducing the pressure head of the shielding gas, a diameter 63 of the gas-through ports 60 may be reduced while still achieving a similar shielding gas flow rate at the work piece 26 that more traditional designs maintain. For example, the diameter 63 of the gas-through ports 60 may be of a size sufficient to obtain a surface area of the gas-through ports 60 in a range between 0.002 square inches and 0.004 square inches depending on a size of the diffuser assembly 48.

The gas-through ports 60 also operate to direct shielding gas axially down a length of the contact tip 56 toward the work piece 26 during a welding operation. Because the shielding gas is directed axially toward the work piece 26, the torch 16 may operate without a welding nozzle to redirect flow of the shielding gas. For example, in other designs where the shielding gas is directed radially outward from a gas diffuser, a welding nozzle may change the direction of the shielding gas flow toward the work piece 26. In contrast, in the present embodiment, the shielding gas is already directed toward the work piece 26, which enables welding operations without the use of a welding nozzle. Further, without a welding nozzle coupled to the diffuser assembly 48, spatter buildup on the diffuser assembly 48 may be reduced. With a reduction in spatter buildup, welding operations may occur for longer amounts of time between maintenance of the torch 16. For example, reaming cycles may occur less frequently when a welding nozzle is not in place. Additionally, the lifespan of welding consumables, such as the contact tip 56, may increase as spatter-related wear decreases. Additionally, without a welding nozzle, a welding operator may be able to perform a welding operation in tighter spaces than if the torch 16 included a welding nozzle. For example, the welding operator may be able to weld in a corner, or any other tight position, that a welding nozzle would traditionally prevent. Moreover, the shielding gas will still be directed toward the work piece 26 in the tighter space even absent the welding nozzle.

The gas-through ports 60 may also facilitate installation and retention of the contact tip 56. For example, the contact tip 56 is urged in an axial direction 61 into the receiving portion 58 of the diffuser assembly 48. The gas-through ports 60 may be positioned and scaled to receive portions of the contact tip 56. Once the contact tip 56 is sufficiently within the receiving portion 58, the contact tip 56 may be rotated in a direction 62 to lock the contact tip 56 within the diffuser assembly 48. Further, the contact tip 56 may rotate approximately 30 degrees before locking within the diffuser assembly 48. This angle of rotation to secure the contact tip 56 may be determined by a number of gas-through ports 60 of the diffuser assembly 48, as discussed in greater detail below in the discussion of FIG. 11A. Additionally, while the direction 62 is illustrated as a clockwise movement, it may be appreciated that the direction 62 in a counterclockwise movement is also contemplated to secure the contact tip 56 within the diffuser assembly 48.

Figure 4:
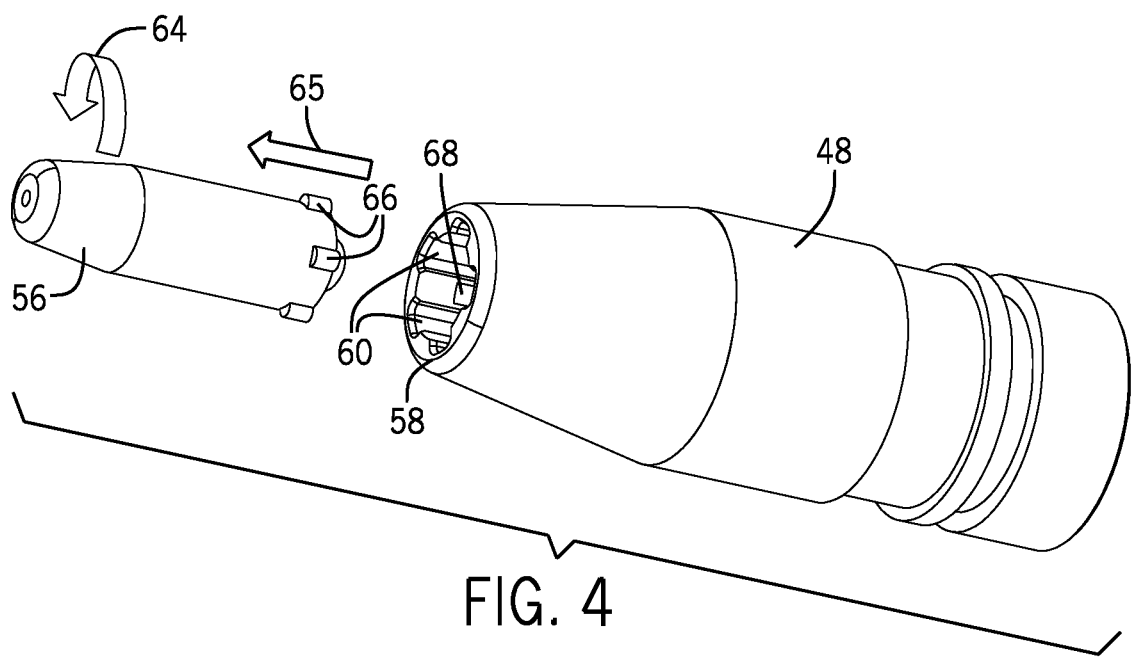
FIG. 4 is a perspective view of a contact tip unsecured from the diffuser assembly of FIG. 3, in accordance with an embodiment.

FIG. 4 is a perspective view of the contact tip 56 unsecured from the diffuser assembly 48. When removing the contact tip 56 from the diffuser assembly 48, a force in the axial direction 61 (i.e., toward the diffuser assembly 48) is applied on the contact tip 56, and the contact tip 56 is rotated in a direction 64 to unlock the contact tip 56 from the diffuser assembly 48. The direction 64 is depicted as a direction opposite the direction 62. Accordingly, when the direction 62 is clockwise, the direction 64 may be counterclockwise. Similarly, when the direction 62 is counterclockwise, the direction 64 may be clockwise. Alternatively, when the contact tip 56 is locked within the diffuser assembly 48, the contact tip 56 may also unlock from the diffuser assembly 48 by rotating an additional amount in the direction 62. For example, while rotating the contact tip 30 degrees in the direction 62 upon insertion into the receiving portion 58 may lock the contact tip 56 within the diffuser assembly 48, rotating the contact tip an additional 30 degrees in the direction 62 may function to unlock the contact tip 56 from the diffuser assembly 48.

When the contact tip 56 is unlocked from the diffuser assembly 48, the contact tip 56 may be removed from the diffuser assembly 48 by providing an axial force on the contact tip 56 in an axial direction 65 away from the torch 16. Upon removing the contact tip 56 from the diffuser assembly 48, a new contact tip 56 may be readied to replace the removed contact tip 56. It may be appreciated that securing, removing, and replacing the contact tip 56 within the diffuser assembly 48 may be accomplished without the use of tools. Further, in some embodiments, securing, removing, and replacing the contact tip 56 may be accomplished using an automated system.

FIG. 4 also depicts locking elements 66 of the contact tip 56. The locking elements 66 may be aligned with the gas-through ports 60 prior to insertion of the contact tip 56 into the receiving portion 58. Additionally, geometries of the locking elements 66 may generally correspond to geometries of the gas-through ports 60. For example, the locking elements 66 may be of a similar shape as the gas-through ports 60 and slightly smaller to allow the locking elements 66 to be inserted into the gas-through ports 60. Further, locking shoulders 68 within the receiving portion 58 are also depicted. The locking shoulders 68 interact with the locking elements 66 of the contact tip 56 after the contact tip 56 is rotated into the locked position. The locking shoulders 68 prevent the contact tip 56 from ejecting from the diffuser assembly 48 while a spring provides a force on the contact tip 56 in the direction 65 urging the locking elements 66 into the locking shoulders 68.

Figure 5:
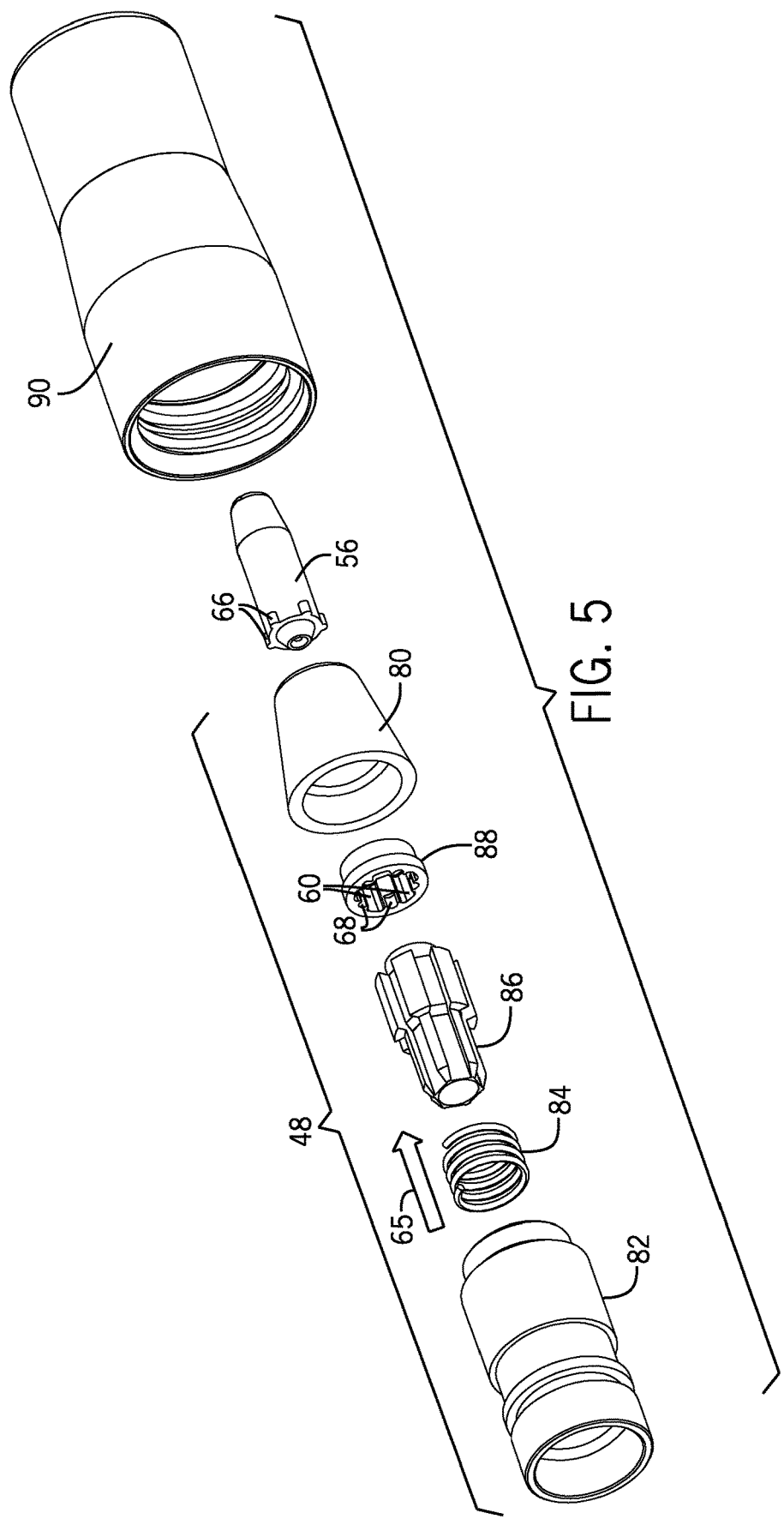
FIG. 5 is an exploded view of the contact tip and the diffuser assembly of FIG. 3, in accordance with an embodiment.

FIG. 5 is an exploded view of the contact tip 56 and the diffuser assembly 48. The exploded view of FIG. 5 provides additional detail into mechanics of the diffuser assembly 48 that secure the contact tip 56 to the torch 16. For example, the diffuser assembly 48 may include an upper body 80 and a lower body 82. In the illustrated embodiment, the upper body 80 couples to the lower body 82 when the upper body 80 and the lower body 82 are pressed together with sufficient force. This may prevent a user from attempting to disassemble the diffuser assembly 48. Additionally, in other embodiments, the upper body 80 may be threaded onto the lower body 82.

Disposed within the upper body 80 and the lower body 82 are a spring 84, a piston 86, and a retention mechanism 88. The spring 84 provides a force in the axial direction 65 against the piston 86 from the lower body 82. The piston 86, in turn, urges the contact tip 56 in the axial direction 65 to either eject the contact tip 56 from the diffuser assembly 48 or urge the locking elements 66 of the contact tip 56 against the locking shoulders 68 of the retention mechanism 88. Whether the spring 84 secures or ejects the contact tip 56 depends on the orientation of the locking elements 66 within the retention mechanism 88. By urging the locking elements 66 against the locking shoulder 68, the spring 84 contributes to securing the contact tip 56 within the diffuser assembly 48. By contrast, when the locking elements 66 align with the gas-through ports 60, the spring 84 contributes to ejecting the contact tip 56 from the diffuser assembly 48.

Additionally, FIG. 5 illustrates a welding nozzle 90 that fits around the diffuser assembly 48. As discussed above, the welding nozzle 90 is an optional component when using the diffuser assembly 48 and the contact tip 56 in a welding operation. The shielding gas exits the diffuser assembly 48 in the axial direction 65 along the contact tip 56, and the welding nozzle 90 may provide greater control over a direction the shielding gas travels toward the work piece 26. Additionally, a similar rotary locking mechanism may be used to secure the welding nozzle 90 to the diffuser assembly 48 as is used to secure the contact tip 56 within the diffuser assembly 48.

FIG. 5 also provides a path along which a welding current may flow. For example, the welding current may flow from the neck 46 of the welding torch 16 to the lower body 82 of the diffuser assembly 48. The lower body 82 of the diffuser assembly may provide a path for the welding current to flow directly into the spring 84, the piston 86, and the upper body 80 based on direct contact with the lower body 82. Additionally, the spring 84 may provide the welding current received from the lower body 82 to the piston 86, and the piston 86 and the upper body 80 may provide the welding current to the retention mechanism 88. Further, the piston 86 and the retention mechanism 88 may provide the welding current to the contact tip 56 based on the direct contact between the contact tip 56 and the piston 86 and the retention mechanism 88. Moreover, the lower body 82, the spring 84, the piston 86, the retention mechanism 88, and the upper body 80 may all be made from conductive materials such as brass or copper.

Figure 6:
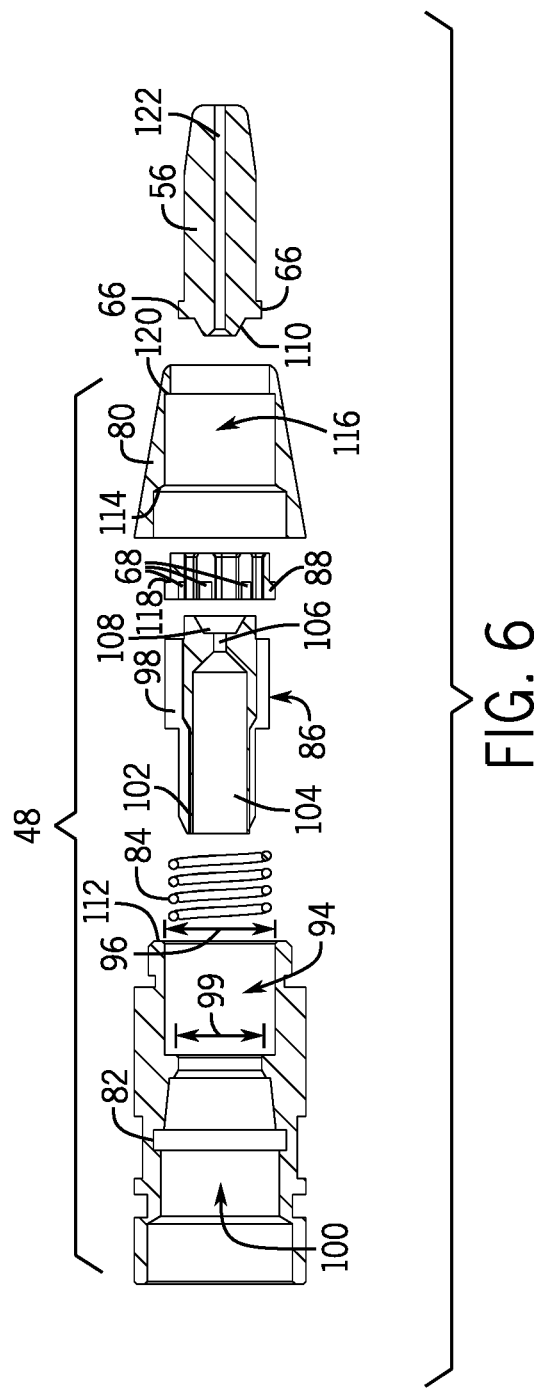
FIG. 6 is a cross-sectional exploded view of the contact tip and the diffuser assembly of FIG. 3, in accordance with an embodiment.

FIG. 6 is a cross-sectional exploded illustration of the contact tip 56 and the diffuser assembly 48. The cross-sectional illustration provides details about cavities within the elements that make up the diffuser assembly 48 and the contact tip 56. For example, the lower body 82 includes a lower cavity 94 that receives the spring 84 and the piston 86. The lower cavity 94 has an inner diameter 96 that is slightly larger than an outer diameter of the spring 84 and an outer diameter of an upper portion 98 of the piston 86. In this manner, both the spring 84 and the piston 86 may fit securely within the lower cavity 94 of the lower body 82.

Additionally, the lower cavity 94 may have an opening with a second inner diameter 99 that leads into a neck coupling cavity 100 of the lower body 82. The second inner diameter 99 is smaller than the inner diameter 96, but large enough to receive a lower portion 102 of the piston 86. In this manner, when the contact tip 56 is inserted into the diffuser assembly 48, the lower portion 102 of the piston 86 is able to retract beyond the lower cavity 94 and into the neck coupling cavity 100. Further, the upper portion 98 of the piston 86 may be prevented from entering the neck coupling cavity 100 due to having an outer diameter larger in size than the second inner diameter 99.

The piston 86 includes a receptacle 104 that receives the electrode 18 originating from the wire feeder 14. Further, the receptacle 104 assists in guiding the electrode 18 into the contact tip 56 and toward the work piece 26. After the electrode 18 enters the receptacle 104, the electrode 18 is funneled into a guide 106 within the piston 86. The guide 106 leads to a contact tip seat 108 of the piston 86, which has complementary geometry to an end protrusion 110 of the contact tip 56. In this manner, the piston 86 provides some structural support to the contact tip 56 while the contact tip 56 is secured within the diffuser assembly 48 while also facilitating delivery of the electrode 18 through the contact tip 56.

As discussed above in the discussion of FIG. 5, the upper body 80 and the lower body 82 may be coupled together by pressing the upper body 80 and the lower body 82 together. FIG. 6 depicts a shoulder 112 of the lower body 82 that interacts with a shoulder 114 of the upper body 80 when the two are forced together. The shoulders 112 and 114 may provide a stop when the upper body 80 and the lower body 82 are forced together. In this manner, the upper body 80 and the lower body 82 may fit together in a consistent manner. That is, the upper body 80 and the lower body 82 may fit together squarely due to the interaction of the shoulders 112 and 114.

Further, once the upper body 80 and the lower body 82 are coupled, an upper cavity 116 of the upper body 80 forms a continuous space with the lower cavity 94 of the lower body 82. By way of example, the upper cavity 116 may have a similar inner diameter to the inner diameter 96 of the lower cavity 94. Because of this, the piston 86 fits securely within the upper cavity 116, and the piston 86 is also free to move in a direction toward the contact tip 56 within the upper cavity 116 or in a direction toward the neck coupling cavity 100 within the upper cavity 116.

Prior to coupling the upper body 80 to the lower body 82, the retention mechanism 88 may be installed within the upper body 80. The retention mechanism 88 includes a shoulder 118 that interacts with a shoulder 120 of the upper body 80. The shoulders 118 and 120 prevent the retention mechanism 88 from exiting the diffuser assembly 48. Additionally, the force provided by the spring 84 on the piston 86 maintains the contact between the shoulders 118 and 120 when the piston 86 is in contact with the retention mechanism 88. Similarly, while the contact tip 56 is secured within the diffuser assembly 48, the locking elements 66 may provide the force on the locking shoulder 68 of the retention mechanism 88 to maintain the contact between the shoulders 118 and 120. Alternatively, in other embodiments, the retention mechanism 88 may be permanently affixed to the upper body 80.

Additionally, the wire (i.e., the electrode 18) is fed from the guide 106 of the piston 86 into the contact tip 56 toward the work piece 26. The contact tip 56 includes an elongated body with a hollow interior 122. Further, the hollow interior 122 receives the wire at an interface between the contact tip seat 108 of the piston 86 and the end protrusion 110 of the contact tip 56, and the hollow interior 122 facilitates transmission of the electrode 18 toward the work piece 26.

Further, FIG. 6 also provides an illustration of a path in which the current may flow. For example, the neck coupling cavity 100 couples to the neck 46 of the welding torch 16. Interaction between the neck 46 and the neck coupling cavity 100 enables the flow of current from the neck 46 to the diffuser assembly 48. Upon entering the diffuser assembly 48, the current may travel to the spring 84, the piston 86 and the retention mechanism 88 in addition to the upper body 80 and the lower body 82. Because the force of the spring 84 urges interaction between the piston 86 and the contact tip 56 as well as the retention mechanism 88 and the contact tip 56, elements of the diffuser assembly 48 with live current have sufficient contact with the contact tip 56 to transfer welding current to the contact tip 56 to produce the arc 24. Accordingly, any one path described above, or any combination of the paths, may provide sufficient contact for adequate current transfer to the contact tip 56.

FIG. 7 is a cross-sectional illustration of the diffuser assembly 48 while the diffuser assembly 48 is not populated with the spring 84, the piston 86, and the retention mechanism 88. As discussed above, upon coupling the upper body 80 with the lower body 82, the lower cavity 94 and the upper cavity 116 form a continuous space in which the spring 84 and the piston 86 reside. Also depicted is a tongue and groove coupling 130 between the upper body 80 and the lower body 82. As illustrated, the a tongue 129 of the upper body 80 fits into a groove 131 of the lower body 82 as the upper body 80 is pressed onto the lower body 82. The tongue and groove coupling 130 may prevent a welding operator from attempting to disassemble the diffuser assembly 48 by, for example, axially separating the upper and lower bodies 80, 82.

Further, grooves 132 may be machined onto the lower body 82 of the diffuser assembly 48. The grooves 132 may accommodate a retaining clip and an o-ring to secure the welding nozzle 90 to the diffuser assembly 48. As discussed above in the discussion of FIG. 5, the diffuser assembly 48 may function without the welding nozzle 90 coupled to the diffuser assembly 48. However, in an event that the welding nozzle 90 would prove beneficial to a welding operation, the diffuser assembly 48 may be equipped with the grooves 132 to enable attachment of the welding nozzle 90.

FIG. 8A is a cross-sectional illustration of the piston 86 that is disposed within the diffuser assembly 48. An upper edge 130 of the piston 86 may correspond to a geometry of the retention mechanism 88. For example, the retention mechanism 88 may have an opening in a middle portion of the retention mechanism 88 that has an inner diameter that is approximately equal to an outer diameter of the upper edge 130 of the piston 86. Because the upper edge 130 fits into the opening of the retention mechanism 88, the piston 86 may aid in pushing the contact tip 56 out of the diffuser assembly 48.

FIG. 8B is a perspective view of the piston 86 illustrated in FIG. 8A. The upper portion 98 of the piston 86 includes protrusions 134 that extend radially outward from the body of the piston 86. The lower portion 102 of the piston 86 also includes smaller protrusions 135 that extend radially outward from the body of the piston 86 and generally align circumferentially with a respective protrusion 134. The protrusions 135 may extend radially outward from the body of the piston 86 at a lesser distance than the protrusions 134. Additionally, the protrusions 134 may have a diameter slightly smaller than the inner diameter 96, and the protrusions 135 may have a diameter slightly smaller than the inner diameter 99. In this manner, the upper portion 98 of the piston 86 may fit securely within the lower cavity 94, and the lower portion 102 of the piston 86 may fit securely within the opening with the inner diameter 99. Further, the protrusions 134 may be sufficiently large to prevent the piston 86 from exiting the diffuser assembly 48 through the retention mechanism 88.

Additionally, the protrusions 134 and 135 create corresponding grooves 133 along a length of the piston 86. The grooves 133 aid in directing the flow of the shielding gas toward the gas-through ports 60 of the diffuser assembly 48 while the piston 86 fits securely within the diffuser assembly 48. The size of the protrusions 134 and 135 and the number of the protrusions 134 and 135 may vary based on a desired flow rate of the shielding gas. For example, if a greater flow rate is desired, the protrusions 134 and 135 may be smaller and/or less frequent as the protrusions 134 and 135 go around the piston 86. Similarly, if a lesser flow rate is desired, the protrusions 134 and 135 may be larger and/or more frequent as the protrusions 134 and 135 go around the piston 86.

FIG. 8C is a top view of the piston 86 of FIG. 8A. The top view illustrates six protrusions 134 spaced equally apart around the piston 86. The six protrusions 134 also create six grooves 133 through which the shielding gas is able to flow. A width 136 of the protrusions 134 may influence the flow rate of the shielding gas as the shielding gas travels to the gas-through ports 60. Accordingly, the width 136 of the protrusions 134 may be increased or decreased depending on a desired flow rate of the shielding gas. Additionally, as discussed above, a number of protrusions 134 may also be increased or decreased depending on a desired flow rate of the shielding gas.

Figure 9A:
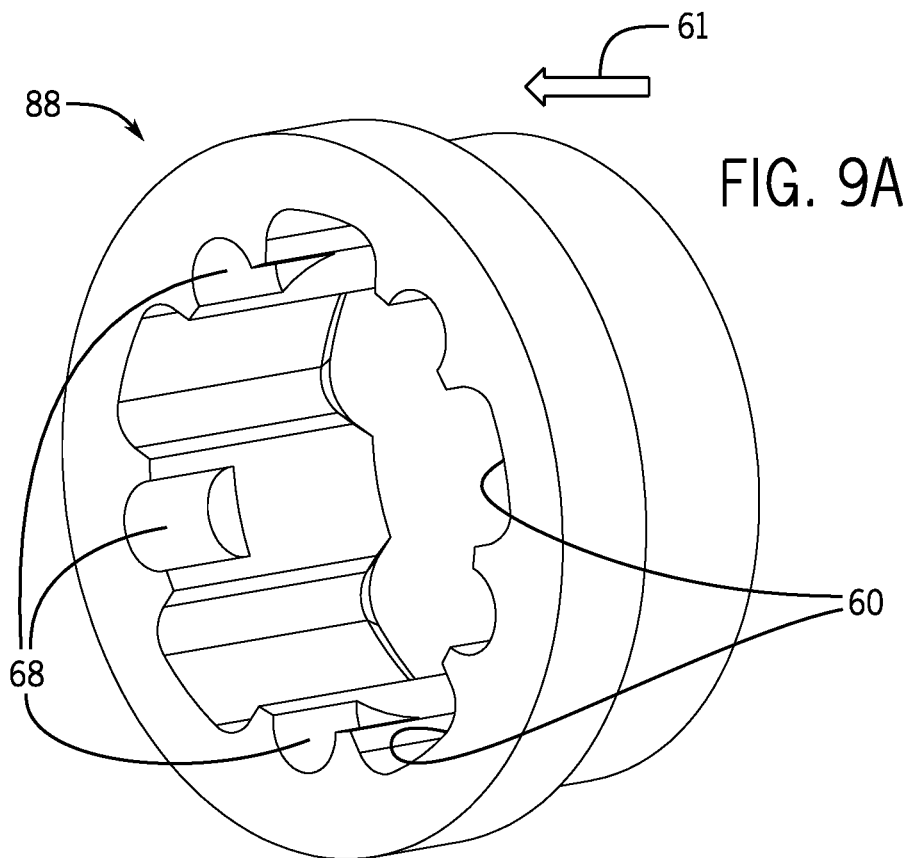
FIG. 9A is a perspective view of a retention mechanism of the diffuser assembly of FIG. 3, in accordance with an embodiment.

FIG. 9A is a perspective view of the retention mechanism 88. The retention mechanism 88 includes locking shoulders 88 that interact with the locking elements 66 of the contact tip 56. Additionally, the retention mechanism 88 includes the gas-through ports 60. The gas-through ports 60 direct the shielding gas axially along the length of the contact tip 56. Additionally, the gas-through ports 60 may include a geometry that receives the locking elements 66 of the contact tip 56. For example, the gas-through ports 60 may generally be a similar shape as the locking elements 66 with a slightly larger diameter than the locking elements 66. Further, as the contact tip 56 rotates within the diffuser assembly, the locking elements 66 of the contact tip 56 may align with the locking shoulders 88. Upon releasing the force in the axial direction 61, the spring 84 may urge the locking elements 66, via the piston 86, into secured contact with the locking shoulders 88 of the retention mechanism 88.

Figure 9B:
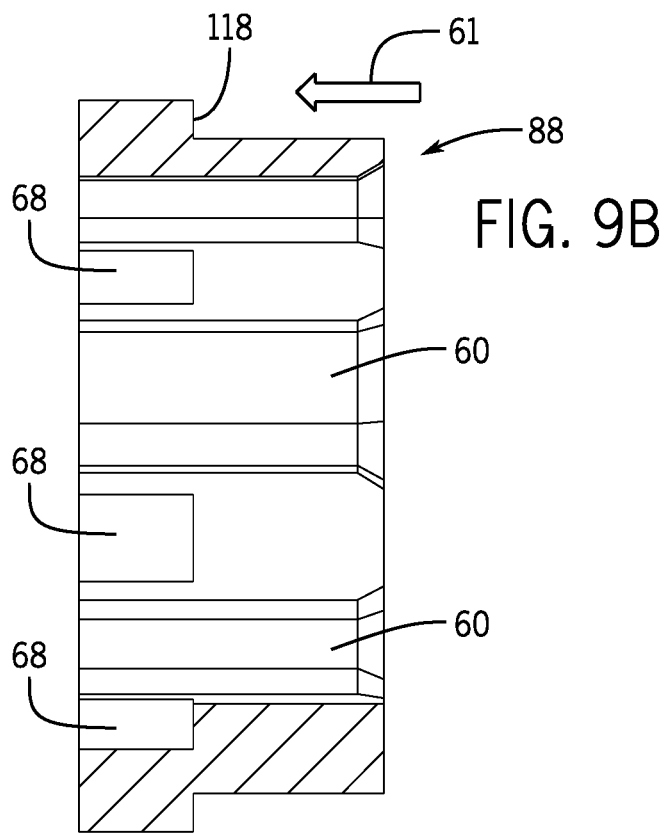
FIG. 9B is a cross-sectional view of the retention mechanism of FIG. 9A, in accordance with an embodiment.

FIG. 9B is a cross-sectional illustration of the retention mechanism 88. As illustrated, the locking shoulders 88 and the gas-through ports 60 include geometries that are receptive to the geometry of the locking elements 66 of the contact tip 56. Accordingly, when the locking elements 66 interact with the locking shoulders 88, the contact tip 56 is unable to rotate to an unlocked position without first applying the force in the axial direction 61 on the contact tip 56 to unlock the locking elements 66 from the locking shoulders 88.

FIG. 10A is a perspective view of the contact tip 56. The contact tip 56 may have a length 137 of approximately 0.5 inches to 3 inches. Additionally, while the contact tip 56 may generally be in the range of 0.5 inches to 3 inches, the contact tip 56 may also be as long as desired for a specific welding operation. Because the diffuser assembly 48 may operate without the welding nozzle 90, it may be beneficial for the contact tip 56 to be shorter than a traditional contact tip to limit a distance that the shielding gas travels prior to dissipating. Further, a diameter 138 of the contact tip 56 may be approximately 0.25 inches to 1 inch. In particular, a range of the diameter 138 between 0.325 and 0.4 inches may be particularly beneficial. It may also be appreciated that the contact tip 56 is made from a conductive material, such as brass or copper.

FIG. 10B is a bottom view of the contact tip 56. As discussed above, the locking elements 66 may have a similar, although slightly smaller, geometry to the geometry of the gas-through ports 60. Additionally, a number of the locking elements 66 surrounding the contact tip 56 may be equal to a number of the gas-through ports 60 and the locking shoulders 68 of the diffuser assembly 48. However, in some embodiments, the number of the locking elements 66 may be less than the number of the gas-through ports 60 and the locking shoulders 68 of the diffuser assembly 48.

Additionally, the end protrusion 110 is tapered to fit into the contact tip seat 108 of the piston 86, which is similarly tapered. Contact between the end protrusion 110 and the contact tip seat 108 is maintained by a spring force provided by the spring 84. Further, the contact between the end protrusion 110 and the contact tip seat 108 is maintained from the time that the contact tip 56 is inserted into the diffuser assembly 48 until the time that the contact tip 56 is ejected from the diffuser assembly 48.

Figure 11C:
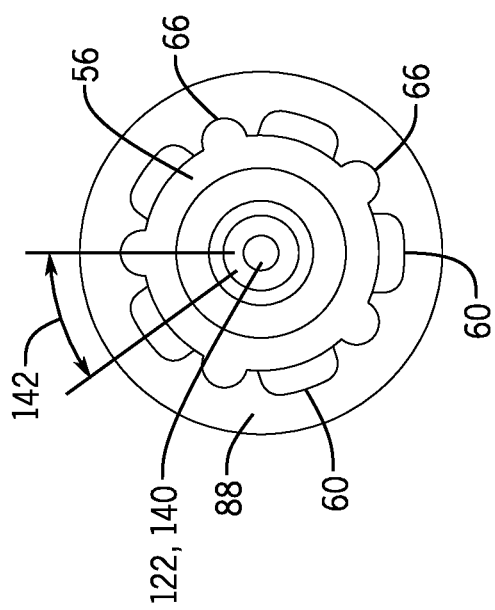
FIG. 11C is a bottom view of the contact tip and the retention mechanism of FIG. 11A, in accordance with an embodiment.
Figure 11B:
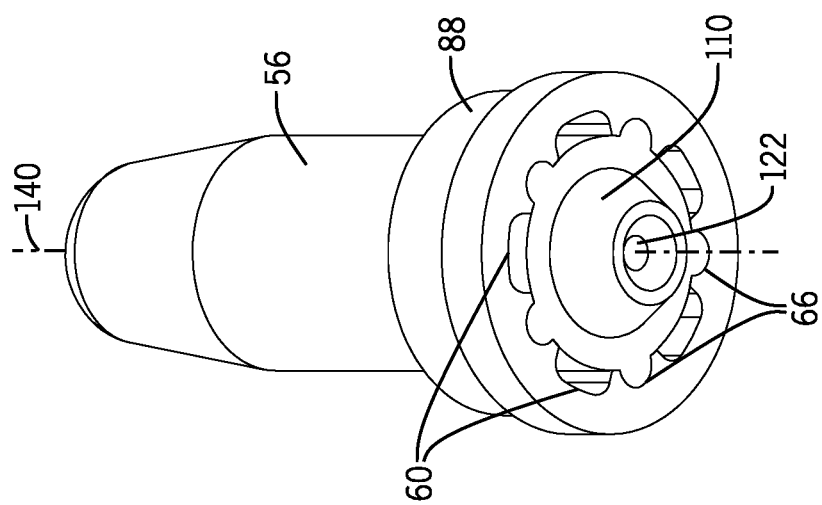
FIG. 11B is a bottom perspective view of the contact tip and the retention mechanism of FIG. 11A, in accordance with an embodiment.
Figure 11A:
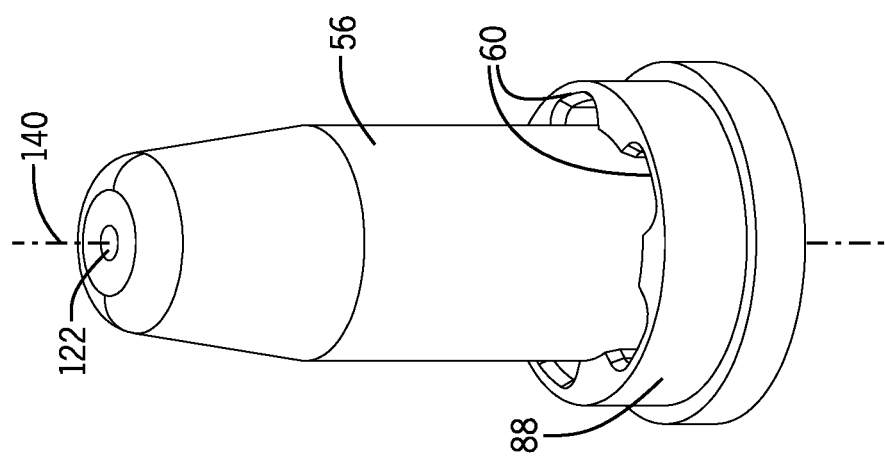
FIG. 11A is a top perspective view of the contact tip of FIG. 10A secured within a retention mechanism of the diffuser assembly of FIG. 3, in accordance with an embodiment.

FIG. 11A is a top perspective view of the contact tip 56 secured within the retention mechanism 88 of the diffuser assembly 48. An axis 140 may run along the hollow interior 122 of the contact tip 56. When securing or ejecting the contact tip 56 to or from the diffuser assembly 48, the contact tip 56 is rotated about the axis 140. Additionally, a number of the gas-through ports 60 of the diffuser assembly 48 may influence a number of degrees that the contact tip 56 rotates about the axis 140 to be secured or ejected. For example, if there are six gas-through ports 60 positioned around the receiving portion 58, and there are also six locking shoulders 88 positioned between each of the gas-through ports 60, then the contact tip 56 rotates $\frac{1}{12}^{th}$ of 360 degress (i.e., 30 degrees) for the locking elements 66 to interact with the locking shoulders 88. Similarly, if there are four gas-through ports 60 positioned around the receiving portion 58, and there are also four locking shoulders 88 positioned between each of the gas-through ports 60, then the contact tip 56 rotates $\frac{1}{8}^{th}$ of 360 degrees (i.e., 45 degrees) for the locking elements 66 to interact with the locking shoulders 88.

FIG. 11B is a bottom perspective view of the contact tip 56 and the retention mechanism 88. As illustrated, the locking elements 66 are in a secured position between the gas-through ports 60. Between the gas-through ports 60, the locking elements are forced against the locking shoulders 68 of the retention mechanism 88 that are illustrated in FIG. 5. When the contact tip 56 is removed from the diffuser assembly 48, the contact tip 56 is rotated about the axis 140 in such a manner that the locking elements 66 generally align with the gas-through ports 60. Once this alignment is achieved, the force provided by the spring 84 will eject the contact tip 56 from the diffuser assembly 48.

FIG. 11C is a bottom view of the contact tip 56 and the retention mechanism 88. The contact tip 56 may rotate about the axis 140 at an angle 142 from an initial position that the contact tip 56 enters the diffuser assembly 48 to secure the contact tip 56 within the diffuser assembly 48. For example, in the illustrated embodiment with six gas-through ports 60 of the diffuser assembly 48, the contact tip 56 rotates 30 degrees to reach the secured position. Alternatively, if there were only four gas-through ports 60 positioned around the locking mechanism 88, the contact tip 56 may rotate 45 degrees about the axis 140 to reach the secured position. Additionally, to remove the contact tip 56 from the diffuser assembly 48, the contact tip 56 may be rotated the same number of degrees about the axis 140 that secured the contact tip 56 to the diffuser assembly 48. This ejection rotation may be in the same direction about the axis 140 as a securing rotation, or the ejection rotation may be in a direction counter to the securing rotation.

Figure 12:
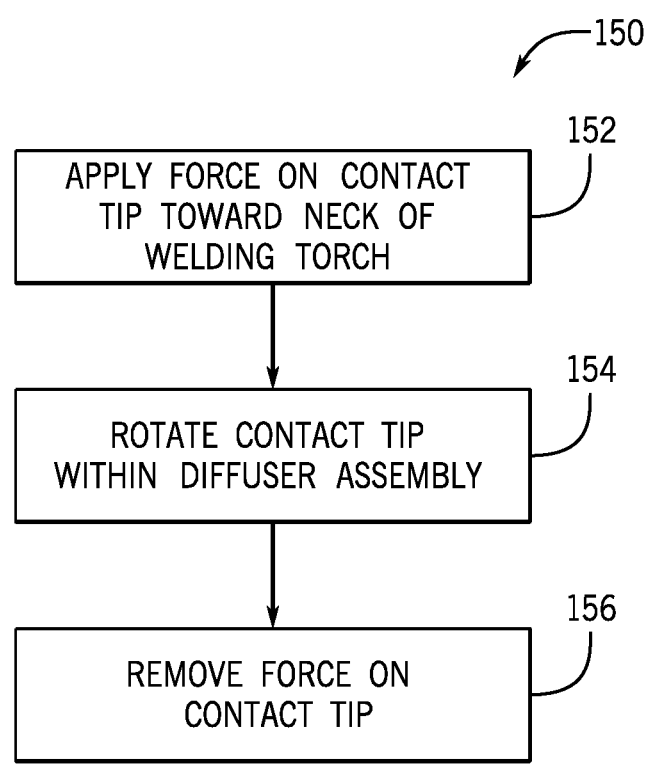
FIG. 12 is a flow diagram of a method to secure and/or remove a contact tip to or from a diffuser assembly of a welding torch, in accordance with an embodiment.
Figure 13:
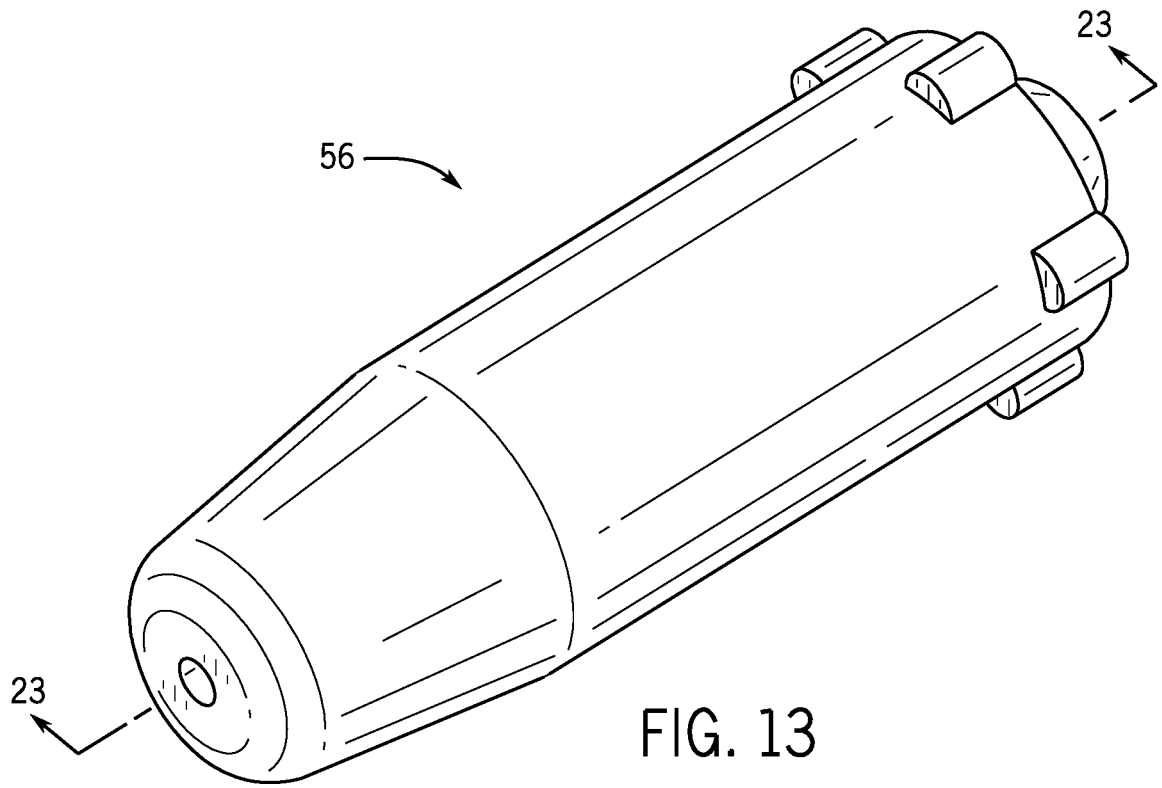
FIG. 13 is a front-side perspective view of a design for the contact tip of FIGS. 10A and 10B, in accordance with an embodiment.
Figure 14:
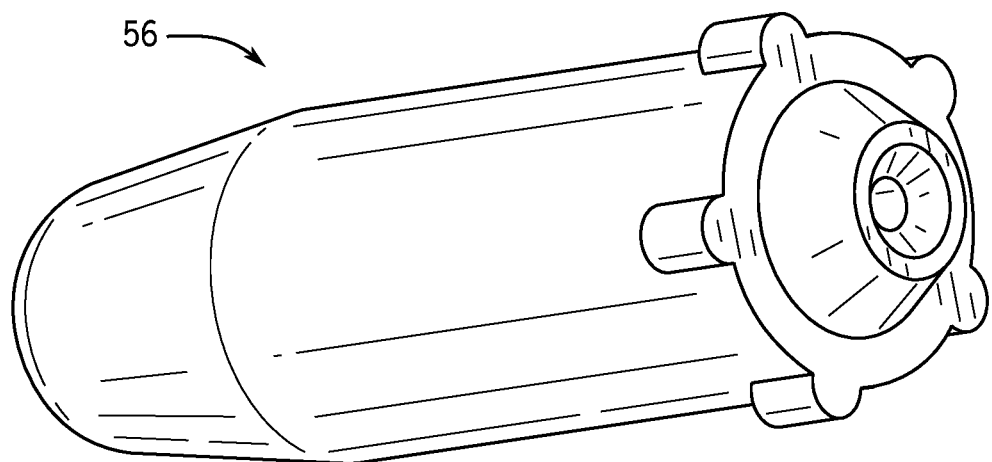
FIG. 14 is a rear-side perspective view of a design for the contact tip of FIG. 13, in accordance with an embodiment.
Figure 15:
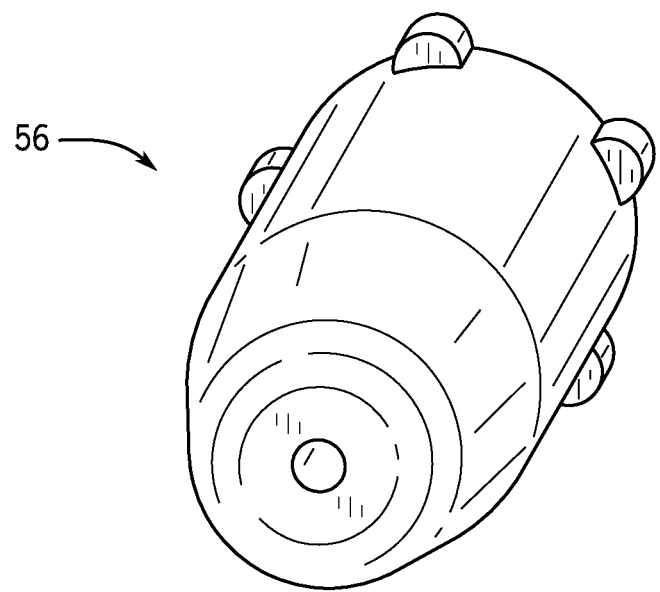
FIG. 15 is a front perspective view of a design for the contact tip of FIG. 13, in accordance with an embodiment.
Figure 16:
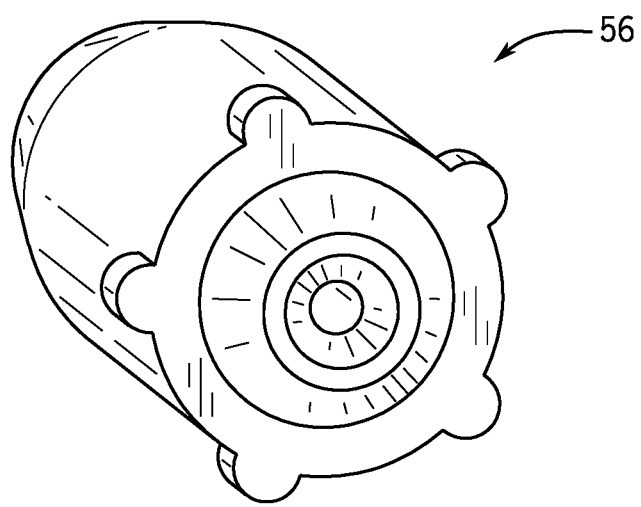
FIG. 16 is a rear perspective view of a design for the contact tip of FIG. 13, in accordance with an embodiment.
Figure 17:
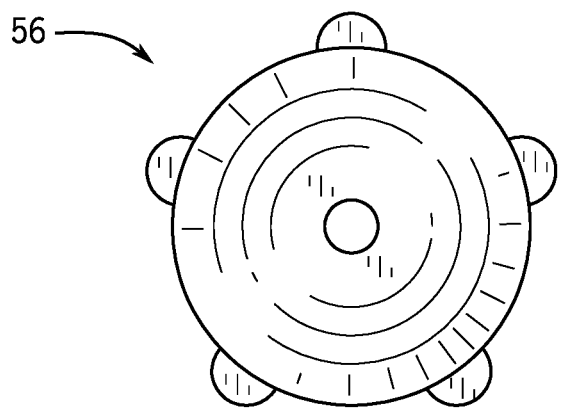
FIG. 17 is a front view of a design for the contact tip of FIG. 13, in accordance with an embodiment.
Figure 18:
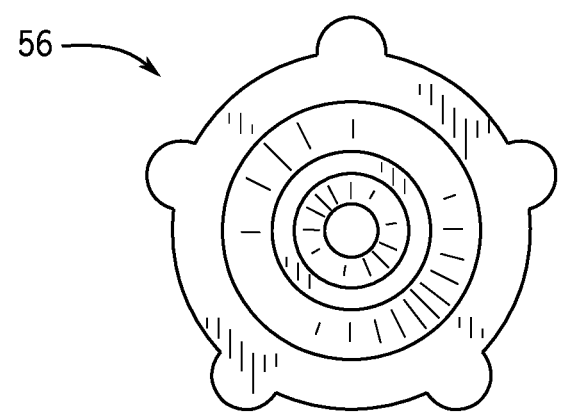
FIG. 18 is a rear view of a design for the contact tip of FIG. 13, in accordance with an embodiment.
Figure 19:
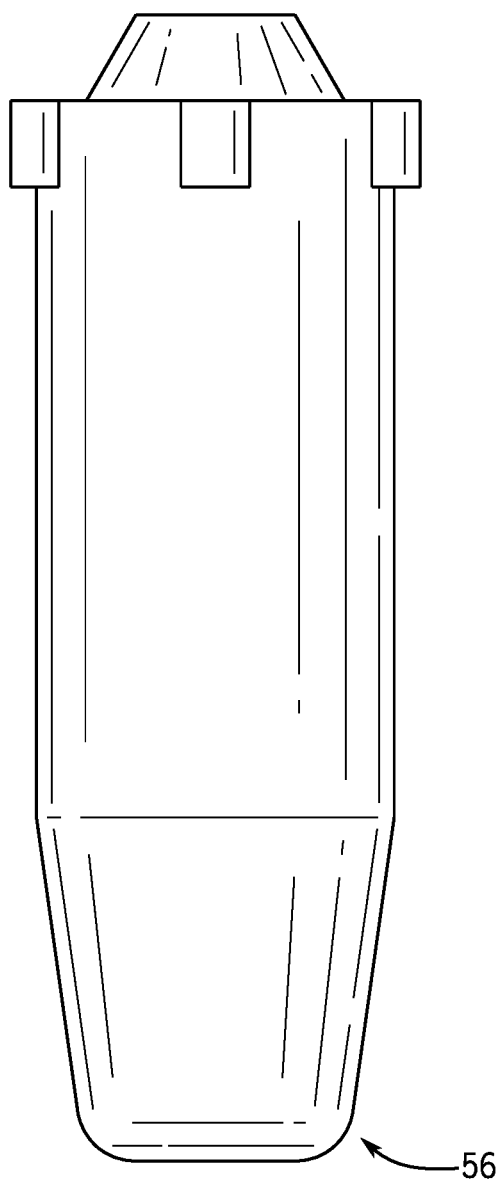
FIG. 19 is a top view of a design for the contact tip of FIG. 13, in accordance with an embodiment.
Figure 20:
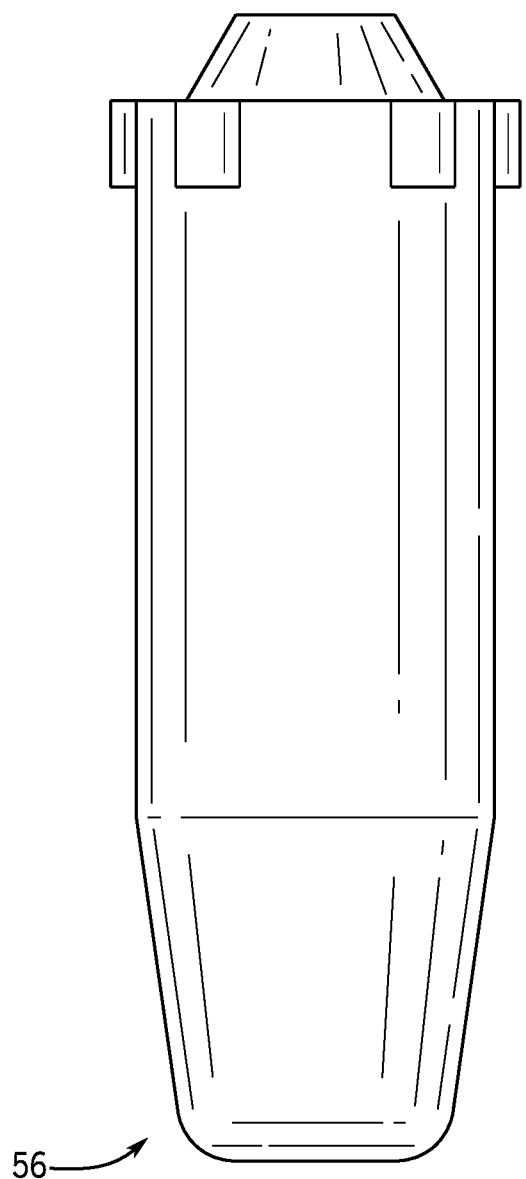
FIG. 20 is a bottom view of a design for the contact tip of FIG. 13, in accordance with an embodiment.
Figure 21:
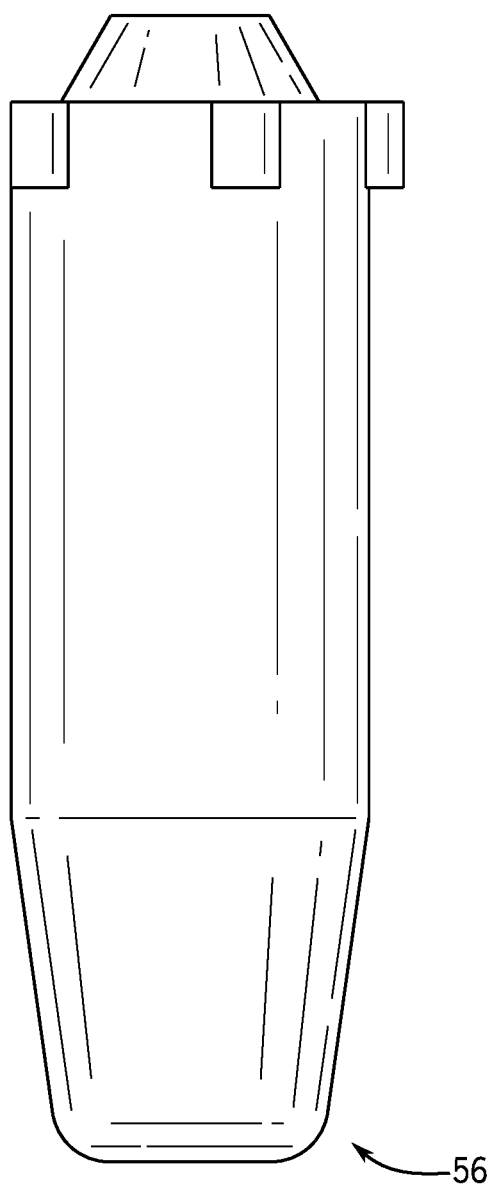
FIG. 21 is a first side view of a design for the contact tip of FIG. 13, in accordance with an embodiment.
Figure 22:
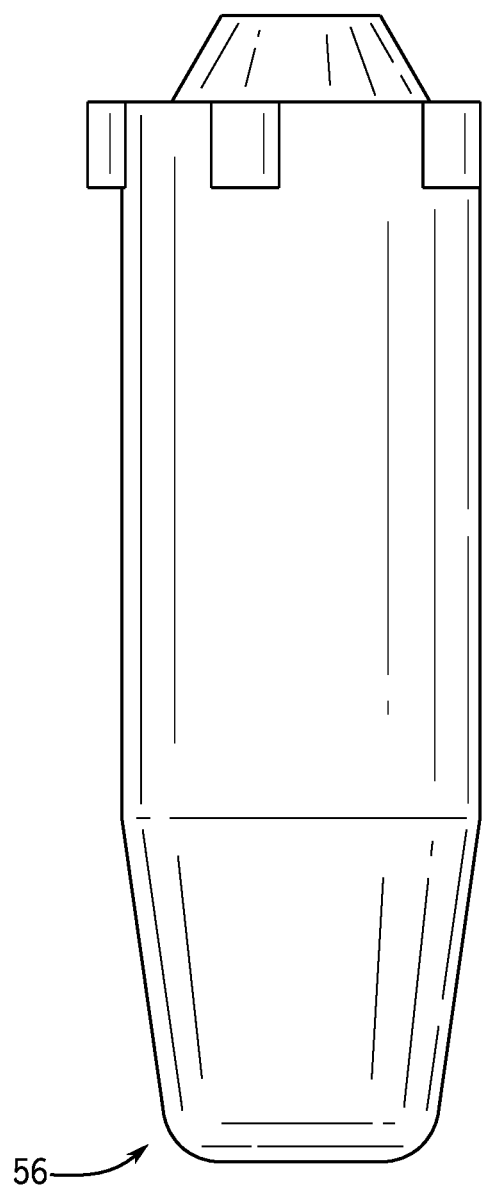
FIG. 22 is a second side view of a design for the contact tip of FIG. 13, in accordance with an embodiment.
Figure 23:
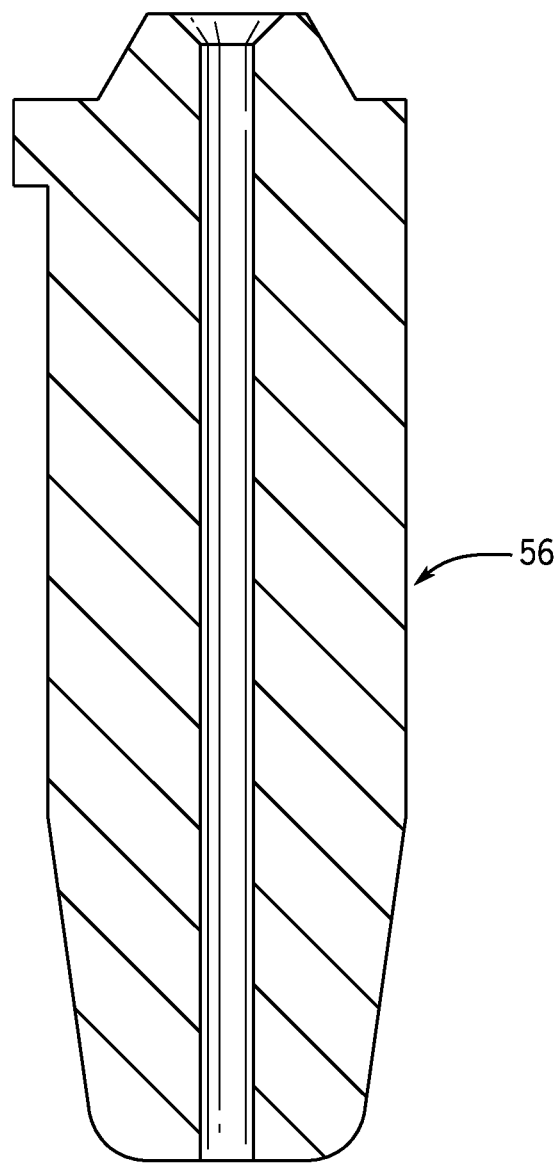
FIG. 23 is a cross-sectional cutaway view of a design for the contact tip of FIG. 13, in accordance with an embodiment.

FIG. 12 is a flow diagram of a method 150 for securing and/or removing the contact tip 56 to or from the diffuser assembly 48. Initially, at block 152, an axial force is applied on the contact tip 56 in the axial direction 61 toward the neck 46 of the welding torch 16 and into the receiving portion 58 of the diffuser assembly 48. The amount of axial force that is supplied on the contact tip 56 is a force sufficient to overcome the force supplied in the axial direction 65 by the spring 84 against the piston 86.

Subsequently, at block 154, the contact tip 56 is rotated about the axis 140 within the diffuser assembly 48. As discussed above, to secure the contact tip 56 within the diffuser assembly 48, the contact tip 56 is rotated in such a manner to align the locking elements 66 of the contact tip 56 with the locking shoulders 68 of the retention mechanism 88. Alternatively, to remove the contact tip 56 from the diffuser assembly 48, the contact tip 56 is rotated in such a manner to generally align the locking elements 66 of the contact tip 56 with the gas-through ports 60 of the diffuser assembly 48.

Further, at block 156, the axial force applied at block 152 is removed from the contact tip 56. In removing the axial force from the contact tip 56, the contact tip 56 will be secured within the diffuser assembly 48 if the locking elements 66 align with the locking shoulders 68. Alternatively, the contact tip 56 will be removable from the diffuser assembly 48 if the locking elements 66 align with the gas-through ports 60 of the diffuser assembly 48.

FIGS. 13-23 illustrate various views of a design for the contact tip 56 described herein.

While only certain features of the subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A welding torch system, comprising:
    a diffuser assembly comprising a locking mechanism and configured to receive a contact tip;

the contact tip comprising locking elements configured to interact with the locking mechanism of the diffuser assembly to secure the contact tip within the diffuser assembly, wherein the contact tip is rotated within the diffuser assembly to securely align the locking elements with the locking mechanism.

2. The welding torch system of claim 1, wherein the welding torch system is configured to perform a welding operation without a welding nozzle.

3. The welding torch system of claim 1, wherein the locking mechanism comprises locking shoulders configured to receive the locking elements of the contact tip when the contact tip is rotated within the diffuser assembly.

4. The welding torch system of claim 1, wherein the diffuser assembly comprises gas-through ports configured to receive the locking elements of the contact tip when the contact tip is axially inserted into the diffuser assembly.

5. The welding torch system of claim 4, wherein the gas-through ports are configured to direct shielding gas in an axial direction along a length of the contact tip.

6. The welding torch system of claim 1, wherein the diffuser assembly comprises:
   a housing;
   a spring disposed within the housing; and
   a piston disposed within the housing, wherein the spring provides a force on the piston toward the contact tip to force the contact tip into a secured position within the locking mechanism or to force the contact tip from the diffuser assembly.

7. The welding torch system of claim 1, wherein the diffuser assembly is configured to retrofit and replace an existing contact tip securement mechanism of a welding torch.

8. The welding torch system of claim 6, wherein the piston comprises a contact tip seat having a geometry complementary to an end portion of the contact tip.

9. The welding torch system of claim 8, wherein the piston further comprises protrusions extending radially from an outer circumference of the piston, and grooves formed between the protrusions.

10. The welding torch system of claim 9, wherein the diffuser assembly further comprises a retention mechanism, wherein the locking mechanism comprises locking shoulders of the retention mechanism configured to receive the locking elements of the contact tip when the contact tip is rotated within the diffuser assembly.

11. The welding torch system of claim 10, wherein the retention mechanism comprises gas-through ports configured to receive the locking elements of the contact tip when the contact tip is axially inserted into the diffuser assembly, wherein the gas-through ports of the retention mechanism and the grooves of the piston are configured to direct shielding gas in an axial direction along a length of the contact tip.

12. The welding torch system of claim 1, wherein the contact tip comprises an electrically conductive material.

13. The welding torch system of claim 1, wherein the contact tip further comprises an elongated body.

14. The welding torch system of claim 13, wherein the elongated body comprises a hollow interior.

15. The welding torch system of claim 13, wherein the locking elements extend radially outward from an outer circumference of the elongated body.

16. The welding torch system of claim 13, wherein the elongated body comprises a front portion, an end portion, and a middle portion positioned between the front portion and the end portion.

17. The welding torch system of claim 16, wherein the front portion or end portion is frustoconical.

18. The welding torch system of claim 16, wherein the locking elements extend radially outward from the middle portion.

19. The welding torch system of claim 16, wherein the middle portion is cylindrical.

20. The welding torch system of claim 19, wherein the locking elements are positioned around the middle portion.

* * * * *